United States Patent [19]

Scheibler et al.

[11] Patent Number: 5,154,752
[45] Date of Patent: Oct. 13, 1992

[54] SUPPRESSION OF FINES DURING THE GRANULATION OF AMMONIUM NITRATE

[75] Inventors: Erich Scheibler; Josef Driller, both of Dortmund; Robert Nebel, Iserlohn, all of Fed. Rep. of Germany

[73] Assignee: Uhde GmbH, Fed. Rep. of Germany

[21] Appl. No.: 334,317

[22] Filed: Apr. 6, 1989

[30] Foreign Application Priority Data

Apr. 9, 1988 [DE] Fed. Rep. of Germany ....... 3811913

[51] Int. Cl.$^5$ .............................................. C05C 1/02
[52] U.S. Cl. ...................................... 71/60; 71/64.05; 71/64.07; 71/64.13; 423/346; 423/554; 423/558
[58] Field of Search ............... 71/59, 60, 64.05, 64.07, 71/64.13; 423/396, 554, 558

[56] References Cited

U.S. PATENT DOCUMENTS 1,966,947 7/1934 Eyer et al.
3,148,946 9/1964 Griffith ..................................... 71/60
3,867,124 2/1975 Church ..................................... 71/1

*Primary Examiner*—Ferris Lander
*Attorney, Agent, or Firm*—Marshall & Melhorn

[57] ABSTRACT

The formation of dust or fines may be suppressed, during the granulation of ammonium nitrate having a nitrogen content of 28% to 34.5%, by a process in which ammonium nitrate is initially granulated to form a raw granulate containing fines, and thereafter heated and contacted by a hydrated sulfate during a second granulation step wherein the fines are affixed to the raw granulate.

12 Claims, No Drawings

SUPPRESSION OF FINES DURING THE GRANULATION OF AMMONIUM NITRATE

FIELD OF THE INVENTION

This invention relates generally to a process for the suppression of dust or fines during the granulation of ammonium nitrate having a nitrogen content of 28% to 34.5%.

BACKGROUND OF THE INVENTION

Ammonium nitrate which is used for example in the production of fertilizers is desirably prepared in the form of granules having a grain size from about 1 to about 4 millimeter average diameter. All granulation processes, however, produce granules outside of this range, requiring a screening stage to eliminate the fines and oversize material. Typically, the oversize material is crushed, and fed together with the fines back to the granulation process. Therefore, the efficiencies of granulation processes depend upon the amount of fines and oversize material which must be returned to the process. A greater amount of this outsize material will require additional equipment and energy for processing.

Dual stage granulation processes are generally known in the art, wherein two different granulation devices are combined in series to initially granulate a material and thereafter to reprocess and granulate the outside material produced in the initial process. It is generally known, for example, to combine prilling and drum granulation, or drum granulation and fluidized-bed granulation, in series. German Patent No. DE-2,164,731 and French Patent No. FR-7,246,363, for example, describe the grain enlargement of ammonium nitrate fertilizers by diverting a portion of the feed stream for a prill tower to a second stage granulating device in which the diverted melt stream is sprayed onto the prills in a drum granulator. This process requires the initial production of prills, which are thereafter enlarged by the addition of further melt material in the drum granulator, to form the end product. The extent to which the formation of outside material can be suppressed is limited, and is dependent on the characteristics of the ammonium nitrate liquid phase, the granulation temperatures, and the use of additives.

SUMMARY OF THE INVENTION

Accordant with the present invention, it has surprisingly been discovered that the formation of dust or fines during the granulation of ammonium nitrate having a nitrogen content of 28% to 34% is suppressed by a process comprising the steps of:

A) granulating ammonium nitrate, to produce a raw granulate containing fines; and
B) simultaneously performing the steps of:
  i) maintaining the raw granulate and fines at a temperature from 100° C. to 125° C.;
  ii) adding to the raw granulate and fines a hydrated material, selected from the group consisting of divalent iron sulfate, trivalent iron sulfate, and magnesium sulfate, in an amount sufficient such that the sulfate concentration is from 0.1% to 1.0% by weight; and
  iii) granulating the raw granulate and fines, wherein a substantial amount of the fines produced in step A are affixed to the raw granulate.

DETAILED DESCRIPTION OF THE PREFERRED EMBODIMENT

The process of the present invention provides for the granulated of ammonium nitrate having a narrow grain size spectrum. The process results in a substantial amount of the ammonium nitrate produced at a finished grain size of about 1 to about 4 millimeters in average diameter.

The process includes a first granulation step in which a raw granulate is formed utilizing one of the known methods such as for example screw, drum, spheroidizer and/or a plate granulator. The dust or fines formed in the first granulation step are then affixed to the raw granulate in the second granulation step. The second granulation process is also conducted at a temperature from 100° C. to 125° C. Additionally, the hydrated form of di- or trivalent iron sulfate is injected into the granulation device used in the second step. Optionally, hydrated magnesium sulfate ($MgSO_4 \cdot 7H_2O$) sulfate may be used.

Experiments have shown that ammonium nitrate granules, having a narrow spectrum of grain sizes, are produced by the addition of hydrated iron sulfate in an amount such that the concentration of iron sulfate ($FeSO_4$) or magnesium sulfate ($MgSO_4$) in the finished product is from 0.1% to 1.0% by weight. It is theorized that the hydrated iron sulfate melts at the processing temperature of the second granulation step, which permits the agglomeration and granulation of the dust or fines. Therefore, the amount of dust or fines resulting from the second granulation step is greatly reduced, thereby reducing the amount of outside material which must be recycled.

Moreover, especially effective results are obtained when both granulation steps are conducted in a single granulating device. Particularly good results are also obtained by utilizing a plate granulator for the first granulation step and a drum granulator for the second granulation step. Furthermore, drying of the resultant material may additionally be conducted during the second granulation step.

While certain representative embodiments and details have been discussed for purposes of illustrating the present invention, it will be apparent to those ordinarily skilled in the art that various changes in applications can be made therein, and that the invention may be practiced otherwise than as specifically described without departing from its spirit and scope. Comparison I A production unit yields alternatively calcium ammonium nitrate with 26%–27.5% N, and ammonium nitrate with 33.5% N. The starting material for the ammonium nitrate production (without admixture of iron sulphate in the granulator) is characterized as follows:

| | |
|---|---|
| N content: | 33.5% |
| $H_2O$ content: | 0.2% (Karl-Fischer method) |
| Granulation additive: | 0.83% |
| Grain hardness: | 3.6 kg |

The results of a screen analysis (in %/wt) are shown below:

| | Product | After granulation | Return cycle |
|---|---|---|---|
| +5 mm | 0 | 11.4 | 0 |
| +4 mm | 0.5 | 15.1 | 1.0 |
| +3.15 mm | 24.4 | 21.6 | 4.2 |

-continued

|         | Product | After granulation | Return cycle |
|---------|---------|-------------------|--------------|
| +2 mm   | 96.0    | 56.2              | 26.3         |
| +1 mm   | 99.0    | 88.3              | 76.7         |
| +0.5 mm | 100.0   | 97.3              | 96.5         |
| −0.5 mm | 0       | 2.7               | 3.5          |
| Total   | 100.0   | 100.0             | 100.0        |

The onsize product (2–4 mm) constitutes 41.1% (56.2–15.1), and the fines (−1 mm) produced by the process equal 11.7% (100–88.3).

EXAMPLE I

Using the same ammonium nitrate production process as utilized in Comparison I, but with the addition of iron sulphate in the granulator, the starting product is characterized as follows:

| N content:           | 33.5%                        |
|----------------------|------------------------------|
| H$_2$O content:      | 0.25% (Karl-Fischer method)  |
| Granulation additive:| 0.98%                        |
| Grain hardness:      | 3.3 kg                       |

The results of a screen analysis (in %/wt) are shown below:

|          | Product | After granulation | Return cycle |
|----------|---------|-------------------|--------------|
| +5 mm    | 0       | 7.4               | 0            |
| +4 mm    | 6.2     | 15.7              | 1.5          |
| +3.15 mm | 45.2    | 36.5              | 9.9          |
| +2 mm    | 99.2    | 81.5              | 47.7         |
| +1 mm    | 100.0   | 98.8              | 87.6         |
| +0.5 mm  | 0       | 99.5              | 98.3         |
| −0.5 mm  | 0       | 0.5               | 1.7          |
| Total    | 100.0   | 100.0             | 100.0        |

The onsize product constitutes 65.8% (81.5–15.7), and the fines equal 1.2% (100–98.8). The proportion of fines is reduced by almost 90%, in relation to Comparison I, with a proportionate increase in the desired grain size. A greater proportion of onsize material will be removed from the process during screening, thereby reducing the quantity of fines in the recycle stream. In order to maintain the optimum temperature and granulation conditions, a certain quantity of the product is added to the return cycle prior to cooling. The overall quantity of outside material in the recycle stream is less than when no iron sulphate is admixed. The capacity of the production unit can thus be increased accordingly, and energy may be saved during the drying process.

What is claimed is:

1. A process for suppressing fines, during the granulation of ammonium nitrate having a nitrogen content of 28% to 34.5% comprising the steps of:
   A) granulating ammonium nitrate, to produce a raw granulate having a plurality of desired granules with an average grain diameter of about 1 to 4 mm, containing fines; and
   B) simultaneously performing the steps of:
      i) maintaining the raw granulate and fines at a temperature from 100° C. to 125° C.;
      ii) adding to the raw granulate and fines a hydrated material, selected from the group consisting of divalent iron sulfate, trivalent iron sulfate, and magnesium sulfate, in an amount sufficient such that the sulfate concentration is from 0.1% to 1.0% by weight; and
      iii) granulating the raw granulate and fines, wherein a substantial amount of the fines produced in Step A are affixed to the desired granules of the raw granulate, the affixing of the fines reducing the proportion of fines at least about 90%.

2. The process for suppressing fines, according to claim 1, wherein the hydrated material of step Bii is divalent iron sulfate or trivalent iron sulfate.

3. The process for suppressing fines, according to claim 2, wherein steps A and B are conduced in a singular granulating device.

4. The process for suppressing fines, according to claim 2, wherein step A is conducted utilizing a plate granulator and step B is conducted utilizing a drum granulator.

5. The process for suppressing fines, according to claim 2, wherein step B includes the simultaneous step of drying.

6. The process for suppressing fines, according to claim 1, wherein the hydrated material of step Bii is magnesium sulfate.

7. The process for suppressing fines, according to claim 6, wherein steps A and B are conducted in a singular granulating device.

8. The process for suppressing fines, according to claim 6, wherein step A is conducted utilizing a plate granulator and step B is conducted utilizing a draw granulator.

9. The process for suppressing fines, according to claim 6, wherein step B includes the simultaneous step of drying.

10. A process as defined in claim 1 in which the sulfate is an iron sulfate.

11. A process as defined in claim 1 in which the sulfate is divalent iron sulfate.

12. A process as defined in claim 1 in which the sulfate is trivalent iron sulfate.

* * * * *